Jan. 14, 1936.  H. NUTT  2,027,650
CLUTCH PLATE
Filed April 25, 1935
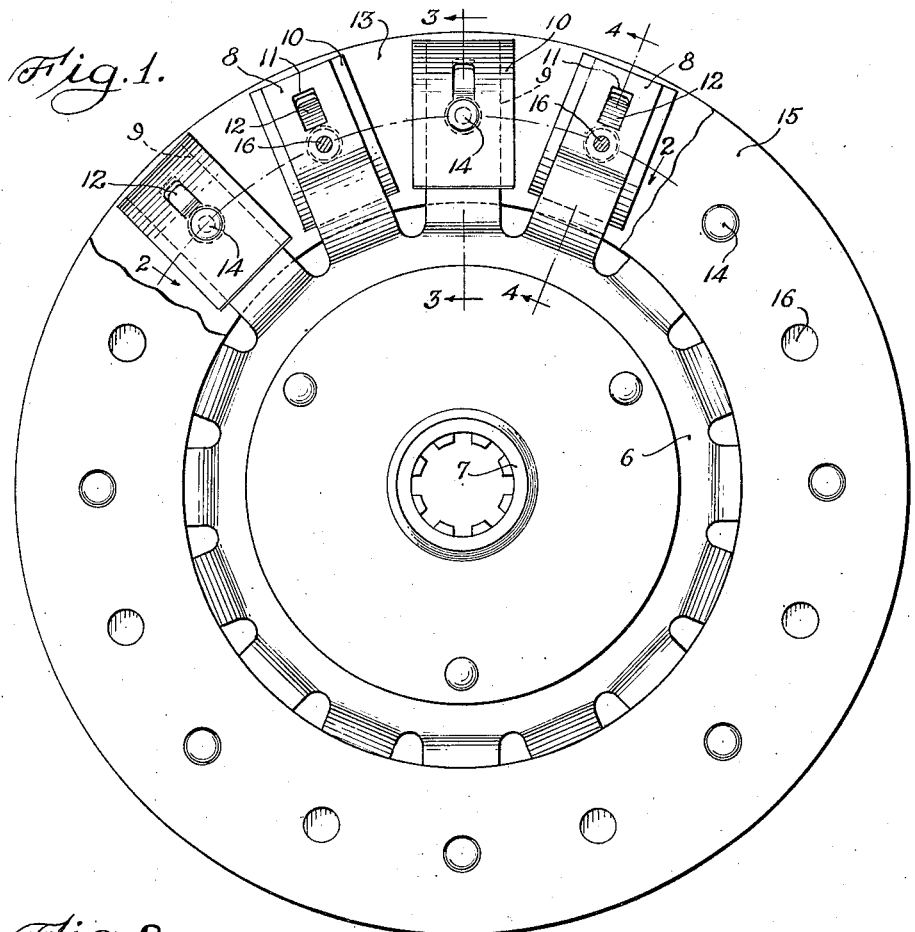
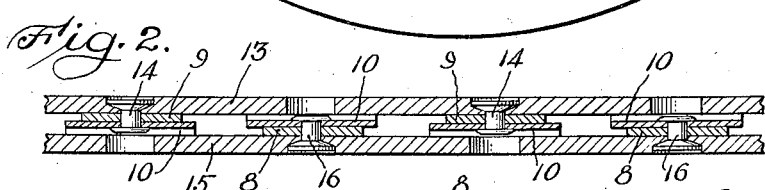
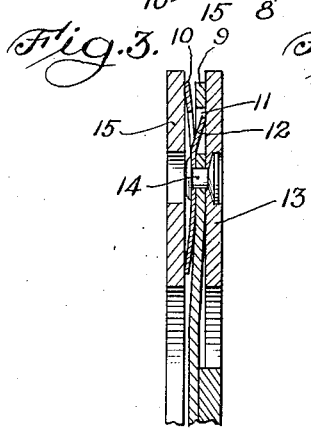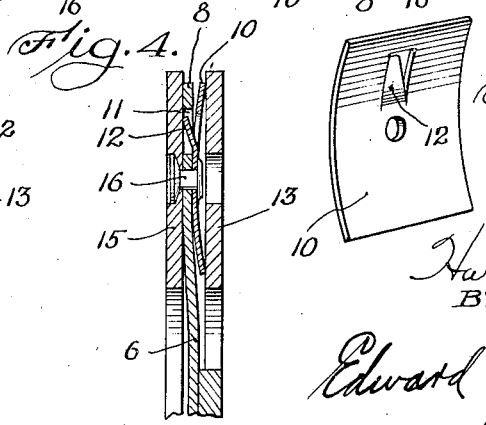
Inventor;
Harold Nutt
BY
Edward C. Gritzbaugh
Attorney Patented Jan. 14, 1936

2,027,650

UNITED STATES PATENT OFFICE 2,027,650

CLUTCH PLATE

Harold Nutt, Chicago, Ill., assignor to Borg-Warner Corporation, Chicago, Ill., a corporation of Illinois Application April 25, 1935, Serial No. 18,108

5 Claims. (Cl. 192—107)

This invention relates to friction clutches for automotive vehicles and it may also be used in other friction clutches for which it is or may be adapted.

The primary object of this invention is to eliminate chattering and brabbing in the engagement of a friction clutch by providing a novel and improved cushion for both friction facings of the clutch plate.

Another object is to provide the facings of a clutch plate with novel cushion members which are separate from the disc of the clutch plate and are therefore capable of being made of higher grade material and accurately with predetermined resiliency and which will be uniform in structure, long-lived, and shaped and disposed to distribute the cushion throughout the extent of both facings.

In the accompanying drawing illustrating the invention

Fig. 1 is a plan view of the clutch plate showing one facing partly broken away;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1; and

Fig. 5 is a perspective view of one of the cushion members of the clutch plate.

Referring to the drawing, the clutch plate selected for illustration comprises a disc 6 secured on a hub 7 which is adapted to be mounted on a driven shaft of an automotive vehicle. The disc is provided with radially extending tongues 8, 9 at its periphery. All of the tongues are bent at their base from opposite sides of the plane of the disc, the tongues 8 being bent from one side and the tongues 9 being bent from the opposite side. The tongues 8, 9 have curved spring cushion members 10 arranged on the side opposite that from which the tongues are bent. The cushion members are arranged with the central portions of their convex sides in engagement with the tongues and their ends spaced from the tongues. This arrangement of the cushion members provides that adjacent tongues will have the cushion members fastened thereto on opposite sides thereof.

A friction facing 13 is arranged on one side of the tongues and engaged with and fastened to the tongues 9 by rivets 14 and engaged with the ends of the cushion members 10 arranged on the tongues 8. The rivets 14 also fasten the cushion members 10 to the tongues 9. Another friction facing 15 is arranged on the other side of the tongues and engaged with and fastened to the tongues 8 by rivets 16 and engaged with the ends of the cushion members 10 arranged on the tongues 9. The rivets 16 also fasten the cushion members 10 to the tongues 8. The tongues have openings 11 provided therein to receive lips 12 struck from the convex side of the cushion members. The lips and the walls of the openings in the tongues cooperate to prevent inadvertent rotation of the cushion members about the rivets 16 and 14.

The cushion members and tongues cooperate to space the facings from the plane of the disc and provide a cushion for the facings during engagement thereof in operation of the clutch to minimize and reduce the grabbing or chattering which would otherwise be produced during engagement. The cushion members 10 are preferably made of a high grade of spring steel which furnishes a better cushion than is provided by the metal of the disc and tongues. The cushion members, because of their being made of a high grade of steel, enable more accurate manufacture and reduce the probability of there being hard spots which would lessen the cushioning value thereof. The amount of curvature in the cushion members is more controllable during manufacture because the material is more uniform in thickness and hardness. The cushion members being located on opposite sides of the plane of the disc enable both facings to be cushioned during engagement. The tongues themselves offer some resistance to compression of the cushion but this is not objectionable because the major part of the cushioning action is afforded by the cushion members. The amount of cushioning can be varied by changing the size of the springs and by changing the specifications for the material out of which the springs are made.

My invention provides a highly efficient cushion clutch plate wherein the facings are mounted parallel to each other for full and complete initial engagement with the driving member of the clutch and for a cushioned engagement of both facings wherein the major part of the cushion is furnished by springs made of separate material from the disc itself for a highly efficient cushioning effect. The cushion members are rigidly held in position on the disc and between the facings.

While I have shown and described the invention in a particular type of clutch plate I do not mean thereby to restrict the invention to the embodiment illustrated nor to the type of clutch plate shown for it can be employed in many different embodiments and kinds of clutches and clutch plates with satisfactory results; and therefore I reserve the right to use the invention in any form and for any purpose for which it is or may be adapted within the scope of the following claims:

I claim:

1. A clutch plate comprising a disc, tongues at the periphery of the disc alternately and oppositely bent from the plane thereof, separate cushion members mounted on opposite sides of adjacent tongues, and friction facings arranged on opposite sides of the disc and engaging the tongues and said cushion members alternately to cushion both of the facings during engagement of the clutch.

2. A clutch plate comprising a disc, tongues at the periphery of the disc alternately and oppositely bent from the plane thereof, separate cushion members mounted on the tongues and secured to the sides thereof opposite that from which the tongues are bent, and friction facings arranged on opposite sides of the disc and secured to the tongues and engaging the tongues and said cushion members alternately to cushion both of the facings during engagement of the clutch.

3. A clutch plate comprising a disc, tongues at the periphery of the disc alternately and oppositely bent from the plane thereof, separate curved spring cushion members mounted on the tongues and having the central portion of their convex sides engaging the tongues and secured thereto and the ends of said cushion members spaced from the tongues and on the opposite side of the plane of the disc, and friction facings arranged on opposite sides of the disc and secured to the tongues and engaging the tongues and ends of said cushion members alternately to cushion both of the facings during engagement of the clutch.

4. A clutch plate comprising a disc, tongues at the periphery of the disc alternately and oppositely bent from the plane thereof, separate cushion members mounted on opposite sides of adjacent tongues, and friction facings arranged on opposite sides of the disc and parallel thereto and engaging the tongues and said cushion members alternately to provide full and complete initial engagement of both of the facings and to cushion the facings during engagement of the clutch.

5. A clutch plate comprising a disc, tongues at the periphery of the disc alternately and oppositely bent from the plane thereof, separate curved spring cushion members mounted on the tongues and having the central portion of their convex sides engaging the tongues and secured thereto and the ends of said cushion members spaced from the tongues and on the opposite side of the plane of the disc, and friction facings arranged on opposite sides of the disc and spaced from the plane thereof and parallel thereto and secured to the tongues and engaging the tongues and ends of said cushion members alternately to provide full and complete initial engagement of both of the facings and to cushion the facings during engagement of the clutch.

HAROLD NUTT.